Dec. 15, 1925.  1,566,056
W. WESTERFIELD
ADJUSTABLE THERMOSTAT VALVE
Filed May 31, 1921  2 Sheets-Sheet 1
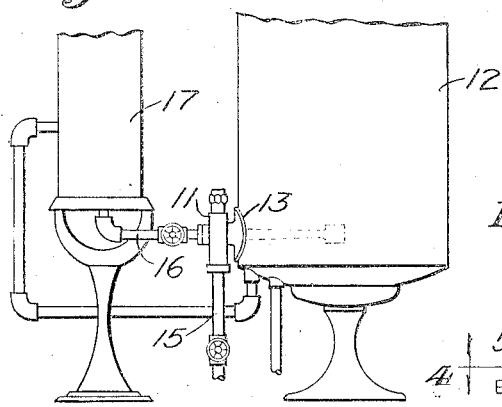
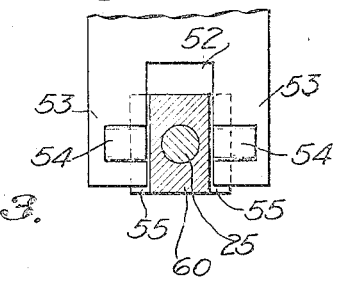
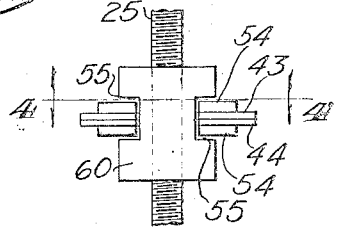
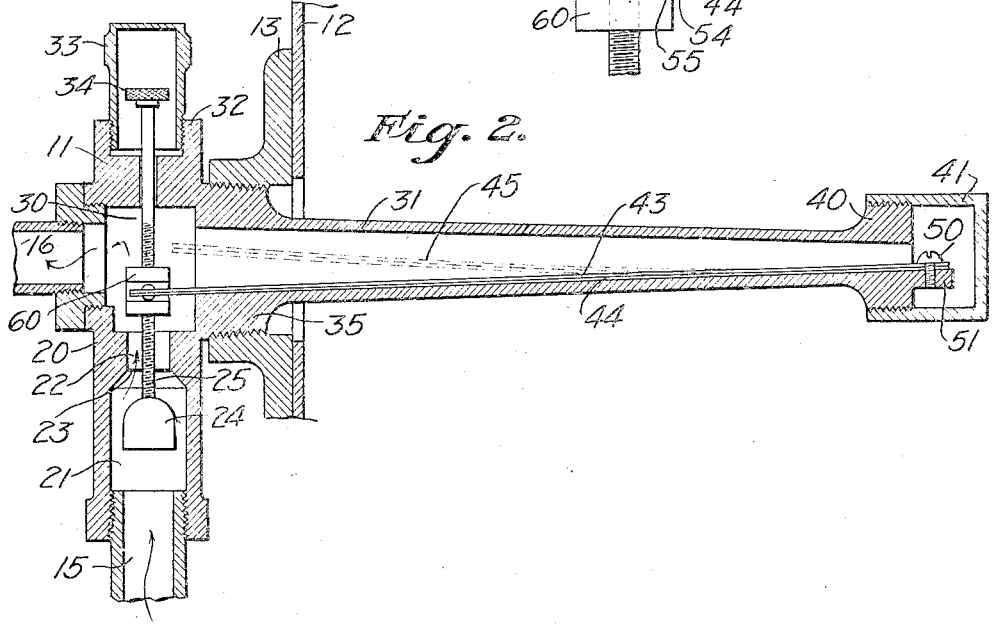
INVENTOR:
WILLIAM WESTERFIELD,
BY Graham & Lewis
ATTORNEYS.

Dec. 15, 1925. 1,566,056
W. WESTERFIELD
ADJUSTABLE THERMOSTAT VALVE
Filed May 31, 1921 2 Sheets-Sheet 2
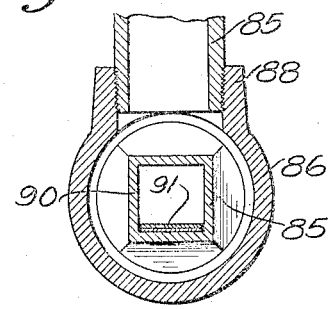
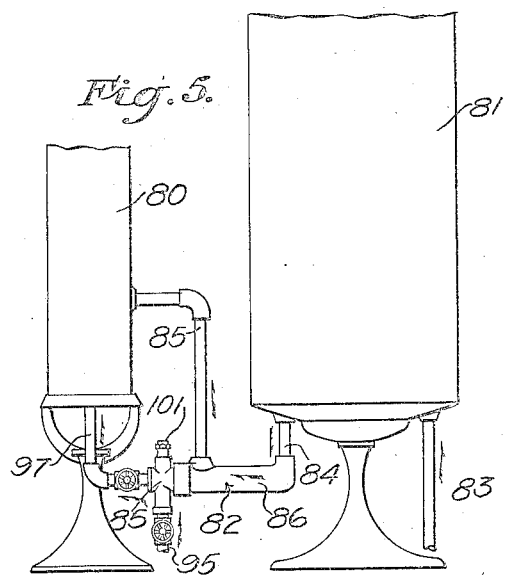
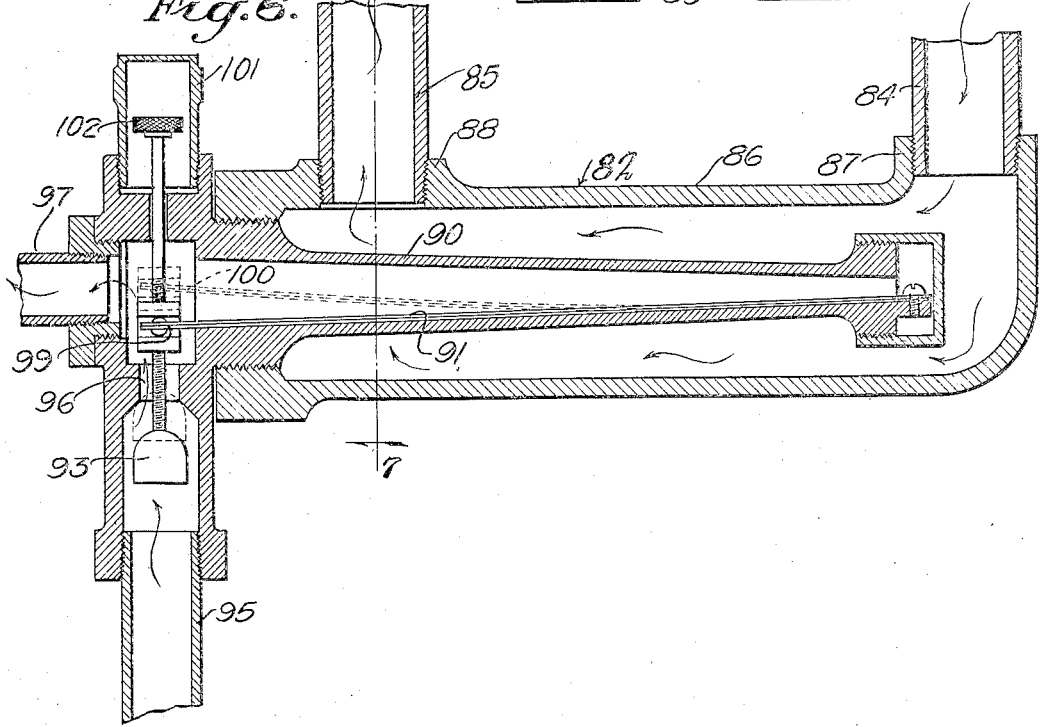
INVENTOR:
WILLIAM WESTERFIELD,
By
Graham + Lewis
ATTORNEYS.

Patented Dec. 15, 1925.

1,566,056

UNITED STATES PATENT OFFICE.

WILLIAM WESTERFIELD, OF PASADENA, CALIFORNIA.

ADJUSTABLE THERMOSTAT VALVE.

Application filed May 31, 1921. Serial No. 473,620.

*To all whom it may concern:*

Be it known that I, WILLIAM WESTERFIELD, a citizen of the United States, residing at Pasadena, in the county of Los Angeles and State of California, have invented a new and useful Adjustable Thermostat Valve, of which the following is a specification.

This invention relates to thermostatic valves through which the flow of gas is controlled by the action of heat upon certain elements of the valve and relates more particularly to thermostatic valves used in water heaters in which the flow of gas used as the heating medium is regulated by the temperature of the water.

It is an object of this invention to provide a valve of this type which may be easily adjusted to shut off the gas at any desired water temperature, and it is a further object of this invention to provide a valve which will respond readily to changes in the water temperature, and which will be of simple design and construction.

Further objects and advantages will be made evident hereinafter.

Referring to the drawing which is for illustrative purposes only,

Fig. 1 is a fragmentary view illustrating an application of my invention.

Fig. 2 is a longitudinal vertical section through the valve shown in Fig. 1.

Fig. 3 is an enlarged end view of the thermostat element and the channelled nut through which it operates the valve stem.

Fig. 4 is a section taken on a plane represented by the line 4—4 of Fig. 3.

Fig. 5 is an elevational view of a water heating and storage unit showing another form of installation to which my valve is applicable.

Fig. 6 is a section through the thermostat valve and the adapter fitting shown in Fig. 5. By this combination a unit suitable for use with standard types of heating apparatus is provided.

Fig. 7 is a section taken on a plane represented by the line 7—7 of Fig. 6.

In Fig. 1 of the drawing, a preferred form of my valve 11 is shown mounted in a water tank 12 by means of a saddle flange 13. In this application the valve 11 is actuated by the temperature of the water within the tank 12 and controls the flow of gas used as a heating agent which enters the valve through a pipe 15 and is delivered through a pipe 16 to a heater 17.

The valve 11 comprises a body 20 having an inlet chamber 21; a throat 22 forming a seat 23 for the valve member 24 which is mounted upon a threaded valve stem 25; a central chamber 30; a hollow arm 31 extending from a point adjacent to the chamber 30; a threaded mounting 32 for a cap 33 which encloses the upper end of the stem 25 and the knurled thumb knob 34 mounted thereupon; and a thermostat element situated within the hollow arm 31 and adapted to actuate the valve member 24.

Upon that portion of the arm 31 adjacent to the body 20 is formed a threaded hub 35 by which the valve body is secured in the flange 13. Upon the other end of the arm 31 is formed a threaded hub 40 upon which screws a cap 41. Within the arm 31 I provide a thermostat which is composed of metal strips, 43 and 44, having different coefficients of expansion. In this application, wherein the valve is actuated by an increase of temperature, the strip 43 is of a metal having a lower coefficient of expansion than the metal of which the strip 44 is made, therefore the subjection of the thermostat to an increase in temperature will cause it to assume the arcuated position indicated by the dotted lines 45 of Fig. 2 thus seating the valve member 24 and shutting off the flow of gas.

One end of the thermostat 42 is secured by a screw 50 to a lug 51 projecting from the hub 40. The opposite end of the thermostat is notched, as indicated at 52 in Fig. 5 and the forks 53 upon which are mounted bearings lugs 54, extend into channels 55 provided in a nut 60 which is threaded upon the stem 25. It will be perceived from the Fig. 5 that the manner in which the forks 53 cooperate with the straight grooves formed in the body portion of the nut 60 prevents the nut from turning upon the valve stem 25.

In the application in which I have herein shown the preferred form of my valve, an increase in the temperature of the water surrounding the arm 31 causes an increase in the distortion of the thermostat, and it will be perceived that the position of the nut 60 will vary according to the temperature to which the thermostat is subjected; also that by screwing the stem 25 either upwardly or downwardly through the nut 60 the valve may be adjusted to close at different temperatures.

Standard installations of water heaters such as are now in common use and which generally consist of a heater 80 and a storage tank 81, as illustrated in Fig. 5, may be converted into continuous storage systems by the use of my thermostat valve unit 82. It is generally the practice to connect the tank 81 with the supply mains through a pipe 83 in order that cold water will be delivered to the tank as the hot water is drawn off at the top, and connection is made with the heater through piping 84 and 85. In this transfer piping I insert the valve unit 82, preferably as illustrated, in order that the temperature of the water in circulation between the tank 81 and the heater 80 may influence the thermostat valve which is mounted in the fitting 86.

The fitting 86 is provided with inlet and outlet ports 87 and 88 into which may be screwed the pipes 84 and 85, the ports being so located that the water flowing therethrough is brought into contact with the full length of the arm 90 which contains the thermostat 91. When the heater is first put into operation, the water in the storage tank 81 and the pipes 84 and 85 which contain the thermostat unit 82 is comparatively cold, and the thermostat 91 will rest in the dormant position illustrated in Fig. 6, and the valve member 93 will be dropped allowing a free passage of gas from the supply pipe 95 through the valve throat 96 and the delivery pipe 97 which leads to the heater 80. As the water is heated by the heater 80, it is transferred through piping, not shown, to the upper part of the storage tank due to the circulation set up by the difference in densities caused by heating. Upon the storage tanks becoming entirely filled with hot water, the hot water is returned through the transfer piping 84 and 85 to the heater 80 and the thermostat 91 is subjected to an increase in temperature and the free end 99 thereof is gradually raised until the position indicated by the dotted lines 100 is reached, and the valve member 93 becomes seated, thus cutting off the flow of gas. It will be perceived that the construction which I have illustrated and described is such that the cap 101 is easy of access, facilitating the removal of same and the adjustment of the valve through the operation of the thumb knob 102.

I claim as my invention:

1. In a thermostat valve, the combination of: a body providing a passage; a hollow arm extending from said body; a throat forming a valve seat in said passage; a closure means receivable by said seat; a threaded stem to support said closure means; a thermostat in said hollow arm; a nut threaded upon said stem, said nut receiving the movable end of said thermostat; and means whereby said stem may be turned in said nut to adjust said closure means, and a cap to enclose the projecting end of said stem to prevent leakage therearound.

2. In a thermostat valve, the combination of: a body providing a passage; a hollow arm extending from said body; a throat forming a valve seat in said passage; a closure means receivable by said seat; a threaded stem to support said closure means; a thermostat in said hollow arm; a nut threaded upon said stem, said nut receiving the movable end of said thermostat, and a knob on said valve stem for turning said stem in said nut to adjust said closure means.

3. In a thermostat valve, the combination of: a body providing a passage; a hollow arm extending from said body; a throat forming a valve seat in said passage; a closure means receivable by said seat; a threaded stem to support said closure means; a thermostat in said hollow arm; a nut threaded upon said stem, said nut receiving the movable end of said thermostat, a knob on said valve stem for turning said stem in said nut to adjust said closure means, and a cap to enclose the projecting end of said stem to prevent leakage therearound.

4. In a thermostat valve, the combination of: a body providing a passage having a valve seat formed therein; a tubular member extending from said body; a thermostat extending within said tubular member; an axially projecting lug formed at one end of said tubular member; a freely accessible screw threading through one end of said thermostat into said lug, for securing said thermostat; a cap covering the end of said tubular member and said lug and a closure member connected to the other end of said thermostat for engaging said seat.

5. In a thermostat valve, the combination of: a body having a passage therethrough; a hollow arm extending from said body; a valve seat in said passage; a threaded stem slidable in said passage; a closure member carried by said stem and coacting with said valve seat; a nut threaded upon said stem; a thermostat having one end secured within said hollow arm and a movable end engaging said nut for actuating said closure member; said stem adapted to be rotated so as to adjust said valve.

6. In a thermostat valve: a body having a passage therethrough; a hollow arm extending from said body; a valve seat in said passage; a threaded stem slidable in said passage; a closure member carried by said stem and coacting with said valve seat; a nut threaded upon said stem; a thermostat having one end secured within said hollow arm and a movable end engaging said nut, preventing rotation thereof, and adapted to actuate said closure member; said stem adapted to be rotated to adjust said valve.

7. In a thermostat valve, the combination of: a body having a passage therethrough; a hollow arm extending from said body; a valve seat in said passage; a threaded stem slidable in said passage; a closure member carried by said stem and coacting with said valve seat; a nut threaded to said stem and provided with straight grooves; a thermostat having one end secured within said hollow arm and a movable end engaging said nut, preventing rotation thereof, and adapted to actuate said closure member; said stem adapted to be rotated to adjust said valve.

8. In a thermostat valve, the combination of: a body having a passage therethrough; a hollow arm extending from said body; a valve seat in said passage; a threaded stem slidable in said passage; a closure member carried by said stem and coacting with said valve seat; a nut threaded to said stem and provided with straight grooves; a thermostat having one end secured within said hollow arm and a movable forked end engaging said nut for actuating said closure member, the forked end of said thermostat coacting with the grooves on said nut for preventing rotation thereof; said stem adapted to be rotated to adjust said valve.

In testimony whereof, I have hereunto set my hand at Los Angeles, California, this 20th day of May, 1921.

WILLIAM WESTERFIELD.